United States Patent

[11] 3,625,303

[72] Inventor John W. Cameron
Rochester, Mich.
[21] Appl. No. 2,768
[22] Filed Jan. 14, 1970
[45] Patented Dec. 7, 1971
[73] Assignee The United States of America as represented by the Secretary of the Army

[54] TERRAIN PROFILER AND PASSIVE MICROWAVE SENSOR FOR CONTROLLING VEHICLE SUSPENSION
4 Claims, 6 Drawing Figs.

[52] U.S. Cl. ................................................. 180/24.02, 180/9.2 R, 180/103
[51] Int. Cl. ........................................................ B62d 55/14
[50] Field of Search ............................................. 180/9.2, 22, 98, 24.02; 343/5-7; 73/78, 176; 280/124

[56] References Cited
UNITED STATES PATENTS
3,003,783 10/1961 Brueder .................... 280/124
3,183,016 5/1965 Gustafsson .................... 180/9.2
3,442,347 5/1969 Hodgson ...................... 180/98
3,452,702 7/1969 Slemmons ..................... 180/9.2 X
3,474,444 10/1969 Okamoto ....................... 180/98 X
3,478,354 11/1969 Foster .......................... 343/5

Primary Examiner—Richard J. Johnson
Attorneys—Harry M. Saragovitz, Edward J. Kelly, Herbert Berl and Maxwell V. Wallace ABSTRACT: A terrain profiler comprising the combination of a laser ranger, a rocking mirror, and a passive microwave sensor for simultaneously automatically controlling vehicle suspension. The device provides means for allowing high speed over irregular terrain by providing a short range laser profiler to control the active suspension of a vehicle automatically and a passive microwave sensor for sensing the crushability of obstacles by disclosing the nature and moisture content of the soil and the nature of the subsoil material.

INVENTOR.
JOHN W. CAMERON

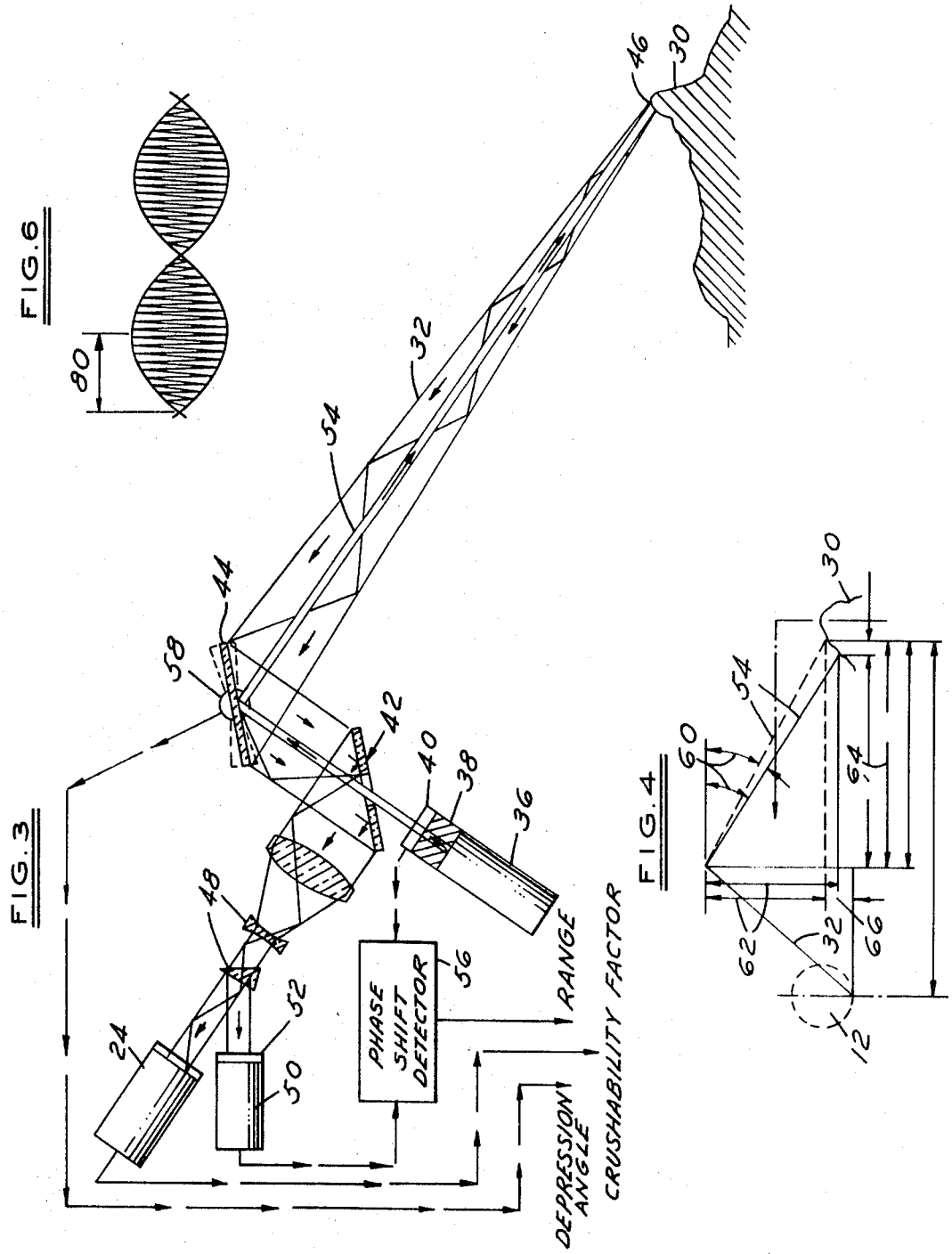

TERRAIN PROFILER AND PASSIVE MICROWAVE SENSOR FOR CONTROLLING VEHICLE SUSPENSION

The invention described herein may be manufactured, used and licensed by or for the Government for governmental purposes without payment to me of any royalty thereon.

This invention relates to vehicle suspension, and more particularly to a new and improved automatic ride control for use in combination with an armored vehicle, such as a battle tank, troop carrier, or the like which is to travel at high speed over rough terrain.

The U.S. patent to Antoine Brueder of Paris, France, No. 3,003,783, issued Oct. 10, 1961, sets forth a vehicle suspension control system wherein he uses a detector adapted to measure directly or indirectly the irregularities of the road and to supply these measurements to a servomotor which controls the suspension members. Various methods are taught in the Brueder patent to accomplish the results desired, one being radar.

Applicant has discovered a new and improved way of using a short range laser profiler which allows high speed of a vehicle over irregular terrain, the same measuring directly or indirectly the irregularities of the road and to supply these measurements to a servomotor which in turn controls the active suspension members, in combination with a passive microwave sensor for determining the crushability of obstacles by disclosing the nature and moisture content of the soil and the nature of the subsoil material.

To provide high mobility over land, one must first consider the nature of the land. Most large areas of land consist primarily of rather firm ground which would appear rough to a vehicle traveling 60 miles per hour. A driver shows down as he approaches a bump. He knows from experience that this will lessen the shock felt by himself and the vehicle. The shock force exerted by the bump to raise the wheel varies inversely with the square of the time available. The available time is inversely proportional to the speed of the vehicle. Therefore, a vehicle traveling 60 miles per hour experiences 25 times as much force on the wheel as does a vehicle traveling 12 miles per hour. Conversely, force at the wheel of the 12 miles per hour vehicle is 96 percent less than the force at the wheel of the 60 miles per hour vehicle. Similar analysis, applied to the absorption of the upward kinetic energy of the wheel by the spring to avoid striking the bump stop, indicates 96 percent less wheel travel required at 12 miles per hour. The power used to move the wheel upward is 99 percent less at 12 miles per hour. The energy absorbed in and dissipated by the damping device will be proportional to this power. This disclosure makes it possible to provide more time in which the wheel may be raised, thus allowing a vehicle traveling 60 miles per hour to experience no more shock to either the wheel or the hull than would a vehicle traveling 12 miles per hour.

At 60 miles per hour a vehicle travels 88 feet per second or approximately 1 inch in 0.001 of a second. To provide accurate, detailed information regarding the profile of the terrain ahead of the vehicle, the sensor should look as closely in front of the first wheel as reasonable. Sensing at close range will minimize shadow areas behind raised bumps and blind areas in the event of a turn. Yet, the sensor must look far enough ahead to provide time to process the signal and actuate the suspension. A distance of 5 to 10 feet ahead will be typical, but may be as much as 120 feet at times.

It has also been found desirable to sense the crushability of the bumps being profiled as it may not be necessary to raise the wheel to the full height of the bump. Also it is necessary to detect major obstacles at longer range (up to 1,000 feet) so the vehicle may be steered, slowed, or stopped to avoid obstacles which are beyond the capability of the suspension. It is also desirable in connection with a long range sensor to detect impassable conditions such as deep water, mud and ravines. The short range profiler would control the active suspension automatically since the response time of man is too slow and his span of concentration too limited. The long range sensor would control steering and braking automatically, but would provide a driver alert and override capability since he could cope better with the major obstacles.

Automatic ride control, consisting of remote sensors and an active suspension, will permit the vehicle to negotiate rough terrain much like a hurdler runs the hurdles, and with as little interruption to speed or smoothness. It will permit the highest possible crosscountry land speed over probably 95 percent of the area to be covered.

The above and other objects of the invention will appear from the following more detailed description, and from the drawings wherein:

FIG. 3 is a schematic view showing how the terrain sensor and laser ranger operate.

FIG. 4 shows a diagram of the wheel position in relation to the laser sensing unit and illustrated computations.

FIG. 6 shows a modulated wave diagram.

Figure 2:
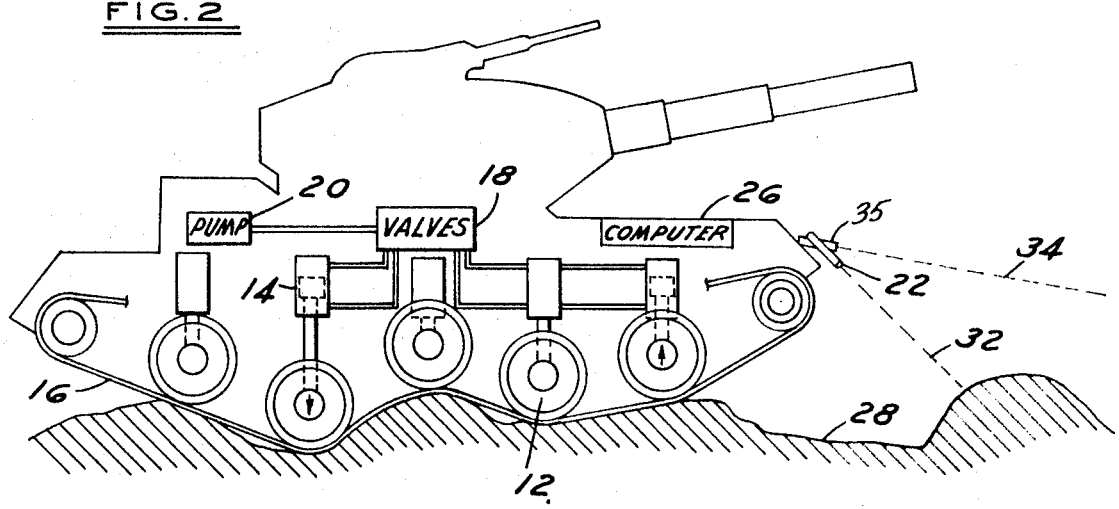
FIG. 2 is a diagrammatic view of a tank showing the laser beams and operation of the tank wheels by symbolic vertical cylinders.
Figure 1:
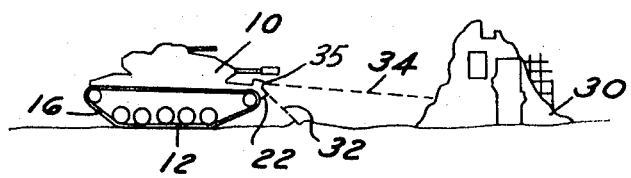
FIG. 1 is a diagrammatic view of the invention showing a tank with laser beams directed to ground and to a distance object.

Referring now to the drawings, the numeral 10 designates a tank, the same having rotatably mounted thereon a plurality of roadwheels 12 by means of cylinders and rods from a piston 14. The wheels 12 have trained thereabout a track 16. The wheels are raised and lowered hydraulically by means of valves 18, the valves receiving fluid from a pump 20. Suitably mounted on the front of the vehicle, adjacent to the leading wheel, is a short range terrain sensor 22 which will measure the profile of the terrain ahead of the vehicle, and the crushability of the same terrain is measured by means of a passive microwave detector 24, both being in communication with a computer 26. The numeral 28 designates the irregularities in the terrain which the vehicle traverses. Numeral 32 designates the laser beam from the terrain profiler 22 and 34 designates the laser beam from the major obstacle sensor 35. Numeral 36 designates a continuous wave gas laser and 38 a modulator which modulates the brightness of the laser beam to create a sine wave. Numeral 40 designates a partial mirror to pick off a portion of the modulated energy as a reference signal. The reference signal is converted to an electrical current by a silicon photodetector for the phase shift detector. The modulated laser beam passes through an opening at the center of the mirror 42 and strikes a rocking mirror 44 which directs the laser beam to the proper point on the terrain 46. The light from illuminated point 46 is reflected back in all directions and a portion of the reflected laser light falls upon rocking mirror 44 from whence it is reflected to mirror 42 and through suitable optical elements 48 and from whence the reflected laser light is directed to a photomultiplier 50 after being filtered through filter 52 which removes light and extraneous wave lengths. The system includes suitable glare shields to minimize reflections of the signal other than from the point 46 on the terrain. The electric signal from the photomultiplier 50 is taken into the phase shift detector where it is compared with the electric signal originating from light picked off by partial mirror 40. The passive mirror waves being emitted by point 46 on the terrain are gathered into the mirror and optical system and directed to a radiometer 24. The signals from the radiometer would be processed in the computer 26 and the crushability factor derived which will be applied to the height signal 66 which controls the raising of the wheels.

As shown in FIG. 4, the slant range 54 is measured by the phase shift detector 56 and the depression angle 60 is measured by a resolver 58 which in turn multiplies the slant range by the sine or the cosine of the depression angle to provide dimensions 62 and 64 which are the vertical height and horizontal distance from the profile sensor 22 to the point 46 on the ground. The vertical height is subtracted from the elevation of the sensor above the front wheel to determine the height of the bump 66 which the wheel must be raised to clear. This height of bump may be modified by the aforementioned crushability signal to avoid use of energy unnecessarily.

FIG. 6 illustrates the brightness modulation of the laser beam, the wave length of the laser beam being about 6,328 Angstroms and the wave length of the modulated wave being about 246 feet at a frequency of 4,000,000 cycles per second. The maximum unambiguous slant range 80 of the profile sensor 22 is half the length of the modulated wave, or 123 feet.

Figure 5:
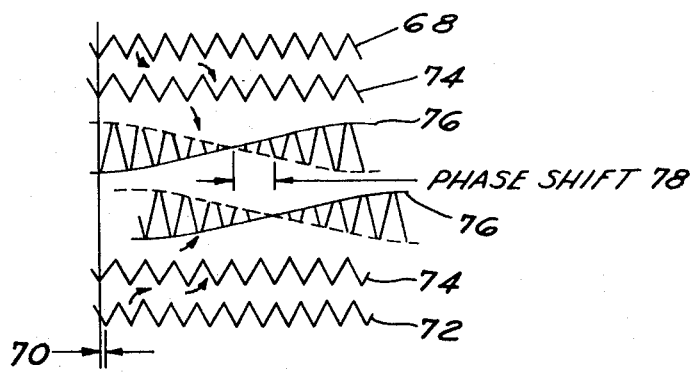
FIG. 5 shows a phase shift diagram.

FIG. 5 illustrates a 4,000,000 cycle per second reference signal 68, offset by the distance 70 from the reflected 4,000,000 cycle per second signal 72. The phase shift indicated by distance 70 is too small to measure accurately with available phase shift detector equipment the 4,000,000 cycle per second signals which are added to 3,990,000 cycle per second signals 74 to produce the two 10,000 cycle per second sine wave signals 76. The phase shift 78 is large enough in time to be measured accurately by the phase shift detector and is the same percentage of the 10,000 cycle per second wave as the phase shift represented by distance 70 was of the 4,000,000 cycle per second wave. Therefore, we now have an accurate measure of the time required for the laser light to travel to the point 46 on the ground and back to the sensor 22. Knowing the speed of light this time delay provides an accurate measure of the slant range 54. Since a heavy vehicle traveling at high speed could not be steered, slowed or stopped quickly enough to avoid disaster if obstacles too large for wheels to be stepped over were encountered, a long range major obstacle sensor 35 will be required. This long range sensor will be similar to the profile sensor, but designed for an unambiguous range up to one thousand feet. It will sweep the path ahead of the vehicle to detect major obstacles which would prevent passage of the vehicle so that the vehicle may be steered to avoid them, or slowed, or even stopped if no open path could be found. This long range sensor would control these functions of steering and braking automatically, but a signal would alert the driver so that he could assume control and override the automatic control. The long range sensor will also sense crushability or passability of the terrain to avoid falling off cliffs or driving into swamps.

The manner in which the device operates is as follows:

The driver of a vehicle, faced with the necessity of negotiating a long drive, say of several hundred miles at high speed, day or night, with maps to indicate the general terrain to be encountered, but with no knowledge of the detailed terrain in the area and faced with the need of avoiding roads and traveling cross country, will depend upon his terrain sensor. The long range sensor indicating that no major obstacles are in the path, the driver will accelerate up to high speed, depending upon the short range sensor to detect bumps in the path of the vehicle and step the wheels in such manner that the wheel is being raised before the vehicle reaches the bump. By thus providing more time to get the wheel raised than would be the case if the bump were to raise the wheel, it is possible to reduce the force exerted upon the wheel that might cause fracture of the wheel by as much as 96 percent. It is also possible to reduce the horse power consumed in raising the wheels by as much as 99 percent. Because of these concepts, based upon the forces being inversely proportional to the second power of the time used to raise the wheel and the horse power being inversely proportional to the third power of the time available to raise the wheel and because there is provided up to five or six times as much time to raise the wheel by virtue of the forward looking remote profile terrain sensor, it is possible to design an active suspension which can be built of reasonably sized components and which will operate with a reasonably sized engine to supply horsepower and with reasonable hydraulic pump and fluid flow requirements and to minimize the weight of the wheels and still have them sufficiently strong.

I wish it to be understood that I do not desire to be limited to the exact details of construction shown and described, for obvious modifications will occur to a person skilled in the art.

I claim:

1. Suspension apparatus for a vehicle to permit same to travel at high speed over bumpy or irregular terrain, comprising, a vehicle having a plurality of road wheels, hydraulic power means, valve means for controlling said hydraulic power, means for individually supporting said wheels on said vehicle including means for raising and lowering the wheels relative to the rest of the vehicle, means for sensing the terrain profile ahead of the vehicle in a range as close as 5 feet and as far as 120 feet and including a laser beam terrain profile sensor mounted on the front of said vehicle, a computer mounted within said vehicle, means for transferring profile sensor signals, warning of terrain irregularities, to said computer whereby said computer will actuate said valves and said wheel support means and hence said wheels to raise and lower same in anticipation of irregularities in the terrain which said vehicle is traversing to minimize the disturbance felt in said vehicle, means for sensing obstacles throughout an unambiguous range up to 1,000 feet in front of the vehicle, including a laser beam obstacle sensor, and means for transferring obstacle sensor intelligence to said computer for initiating vehicle control to avoid such obstacles.

2. Suspension apparatus for a vehicle to permit same to travel at high speed over bumpy or irregular terrain, comprising, a vehicle having a plurality of road wheels, hydraulic power means, valve means for controlling said hydraulic power, means for individually supporting said wheels on said vehicle, means for sensing the terrain profile ahead of the vehicle in a range as close as 5 feet and as far as 120 feet and including a laser beam terrain profile sensor mounted on the front of said vehicle, and a microwave sensor to concurrently sense the crushability of the profiled terrain, a computer mounted within said vehicle, means for transferring profile sensor and microwave sensor signals, warning of terrain bumps, to said computer, whereby said computer will actuate said valves and said wheel supporting means and hence will move said wheels to raise and lower same in anticipation of irregularities in the terrain which said vehicle is traversing to minimize the disturbance felt in said vehicle, said microwave sensor thereby reducing the necessary wheel motion because the microwave sensor has determined that the profiled bump is at least partially crushable, thus conserving engine energy.

3. Suspension apparatus for a vehicle to permit same to travel at high speed over bumpy or irregular terrain, comprising, a vehicle having a plurality of roadwheels, hydraulic power means, valve means for controlling said hydraulic power, means for individually supporting said wheels on said vehicle, means for sensing terrain characteristics ahead of the vehicle in two distinct ranges of which one is a short range varying from 5 feet in front of the vehicle to 120 feet in front of the vehicle and the other is a long range up to 1,000 feet in front of the vehicle, the sensing means including a laser beam terrain profile sensor and a microwave sensor for short range sensing, and a laser beam long range major obstacle sensor, a computer mounted within said vehicle, means for transferring profile sensor, microwave sensor and long range laser sensor signals, warning of terrain bumps and major obstacles, to said computer, whereby said computer will actuate said valves and said wheel supporting means and hence said wheels to raise and lower the wheels in anticipation of irregularities in the terrain which said vehicle is traversing to minimize the disturbance felt in said vehicle, said long range laser sensor being added to warn of major obstacles too large to step said vehicle wheels over so that said vehicle may be steered to avoid said major obstacle or so that said vehicle may be slowed to negotiate said obstacle or even stopped to avoid a serious accident.

4. Suspension apparatus for a vehicle to permit same to travel at high speed over bumpy or irregular terrain, comprising, a vehicle having a plurality of road wheels, hydraulic power means, valve means for controlling said hydraulic power, means for individually supporting said wheels on said vehicle, means for sensing terrain characteristics ahead of the vehicle in two distinct ranges of which one is a short range varying from 5 feet in front of the vehicle to 120 feet in front of the vehicle and the other is a long range up to 1,000 feet in front of the vehicle, the sensing means including a laser beam terrain profile sensor and a microwave sensor for short range sensing, a laser beam long range major obstacle sensor, and a long range microwave major obstacle sensor, a computer mounted within said vehicle, means for transferring profile sensor, microwave sensor, long range laser sensor and long range microwave sensor signals, warning of terrain bumps, to said computer, whereby said computer will actuate said valves and hence said wheels to raise and lower same in anticipation of irregularities in the terrain which said vehicle is traversing to minimize the disturbance felt in said vehicle, said long range microwave sensor being added to detect impassable conditions, such as swamps, deep mud or water.

* * * * *